FIG. I

INVENTOR
ROLAND ROCHE

ATTORNEYS

April 10, 1973        R. ROCHE        3,726,760

CONTROL SYSTEM FOR GAS-FILLED CONTROL ROD

Filed Nov. 8, 1968        3 Sheets-Sheet 3

INVENTOR
ROLAND ROCHE

BY *Craig & Antonelli*

ATTORNEY

United States Patent Office 3,726,760
Patented Apr. 10, 1973

3,726,760
CONTROL SYSTEM FOR GAS-FILLED
CONTROL ROD
Roland Roche, Clamart, France, assignor to Commissariat
a l'Energie Atomique, Paris, France
Filed Nov. 8, 1968, Ser. No. 774,306
Claims priority, application France, Nov. 13, 1967,
127,977
Int. Cl. G21c 7/22
U.S. Cl. 176—86 G                                    4 Claims

ABSTRACT OF THE DISCLOSURE

A method and apparatus for regulating the pressure of a gaseous neutron-absorbing mixture contained in a circulation loop which is placed within a nuclear reactor core. The loop is respectively connected to a low-pressure reservoir and to a high-pressure reservoir by means of two electrovalve assemblies, the two reservoirs being connected to each other by means of a pump. The areas of the openings of the throttles which provide a communication between the circulation loop and each of the two reservoirs are variably controlled in dependence on the highest value of the pressures established within the vessels which are connected to each throttle.

---

This invention relates to a method for controlling the operation of a nuclear reactor by producing a variation in the neutron transparency of vessels placed in the reactor core. The invention also relates to a device for carrying out said method.

Reactors which are controlled by means of a method of this type are already known and are in fact equipped with hollow control rods filled with a gaseous neutron-absorbing mixture. The neutron-transparency of the control rods can be controlled by regulating the pressure of the neutron-absorbing mixture within said control rods which are stationary.

The application of this method is particularly attractive since it permits the achievement of extremely high precision in the control of nuclear reactors. The utilization of the method also simplifies the construction of the reactor since the control mechanisms can be placed at a distance from the control rods, connections being provided by means of tubes of small diameter.

FIG. 1 illustrates the device for regulating gas-filled control rods 2 of a nuclear reactor, that is to say hollow rods containing neutron-absorbing gas. Said device is constituted, for example, by a high-pressure reservoir 4 and a low-pressure reservoir 6 which are respectively connected to the control rods 2 by means of two assemblies 8, 10 each consisting of an electrically or electromagnetically controlled valve 12 (or 16) and of a diaphragm 14 (or 18). The two reservoirs are connected to each other by means of a vacuum pump 20 which is intended to force the neutron-absorbing gas towards the high-pressure reservoir. A valve similar to valve 12 forms part of a safety loop.

By reason of the fact that the area of the opening of each diaphragm is fixed, the rate of variation (which varies as a function of the pressure) of reactivity of the reactor with which the regulating device of FIG. 1 is associated is consequently very rapid. Under these conditions, reactor control is a particularly complex problem. Furthermore, the uncertainty which exists in regard to the residual negative reactivity (the amount by which the reactivity of the reactor can be lessened by driving in the control rods to the maximum) of the control rods is highly objectionable.

The present invention is directed to a method of regulating the pressure of the neutron-absorbing mixture contained in vessels which are disposed within a reactor core and which constitute the reactivity control system, wherein said method makes it possible to govern the rate of variation of reactivity according to a predetermined law.

In the method according to the invention for regulating the pressure of a gaseous neutron-absorbing mixture contained in a circulation loop which is disposed within a nuclear reactor core, said loop being respectively connected to a low-pressure reservoir and to a high-pressure reservoir by means of two assemblies each having an electrically controlled valve and a flow restriction means, the cross-section of the opening of the throttles which provides a communication between the circulation loop and one of the two reservoirs is automatically adjusted in response to the pressure within said one reservoir or said circulation loop.

In accordance with a first embodiment of said method, the cross-section of the opening of the throttle is varied in dependence on the values of the pressures prevailing within the loop and reservoirs, whichever is higher.

In a second embodiment, the cross-section of the openings of the two diaphragms are varied in dependence on the pressure established within the reactivity-control loop or system which is filled with the gaseous mixture. This variant has the advantage of simplifying the structure of the apparatus.

The invention is also directed to a device for the practical application of said method. Said device is essentially made up of two needle valves providing a connection between a circulation loop which forms the gas-filled control rods and the low-pressure and high-pressure reservoirs, the positions of said control rods being set by means of two actuating units controlled by two computers which are connected to said circulation loop and to the high-pressure reservoir by means of two tubes.

In a simplified embodiment of the invention, the positions of the needles of each valve are controlled by means of a piezometric capsule (pressure responsive capsule) which is subjected to the pressure of the gaseous mixture within the reactivity-control loop. The loop is then connected respectively to the low-pressure and high-pressure reservoirs by means of two needle valves which are position-controlled by a capsule comprising at least one flexible element; said capsule is filled with a control fluid under a predetermined pressure and is subjected externally to the pressure which prevails within the reactivity-control loop.

In order that the present invention may be more fully understood, embodiments thereof will be described with reference to the accompanying drawings, in which.

Figure 4:
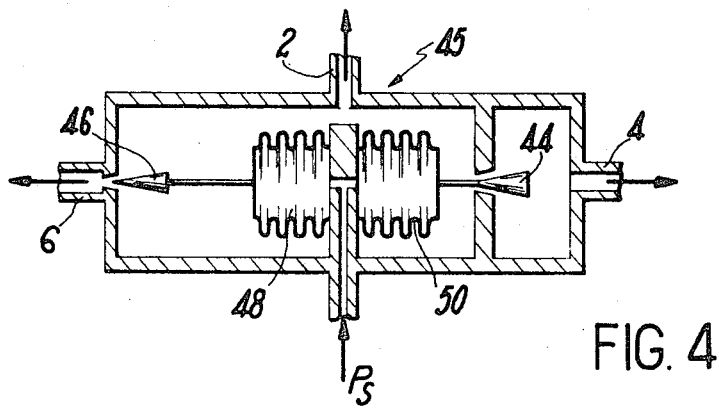
Figure 5:
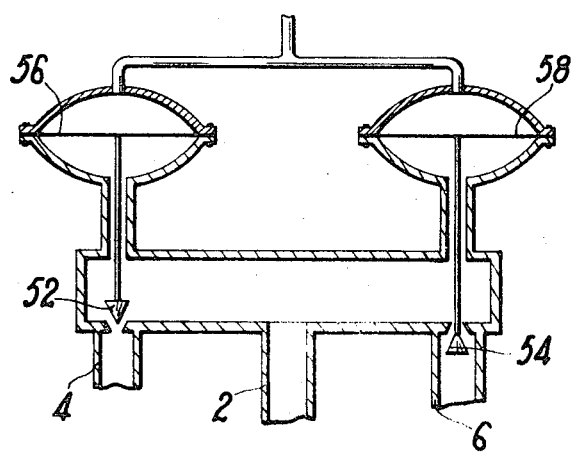

The devices of FIGS. 4 and 5 serve to regulate the pressure within the gas-filled control rods by means of two needle valves which are controlled by a fluid under pressure.

Figure 1:
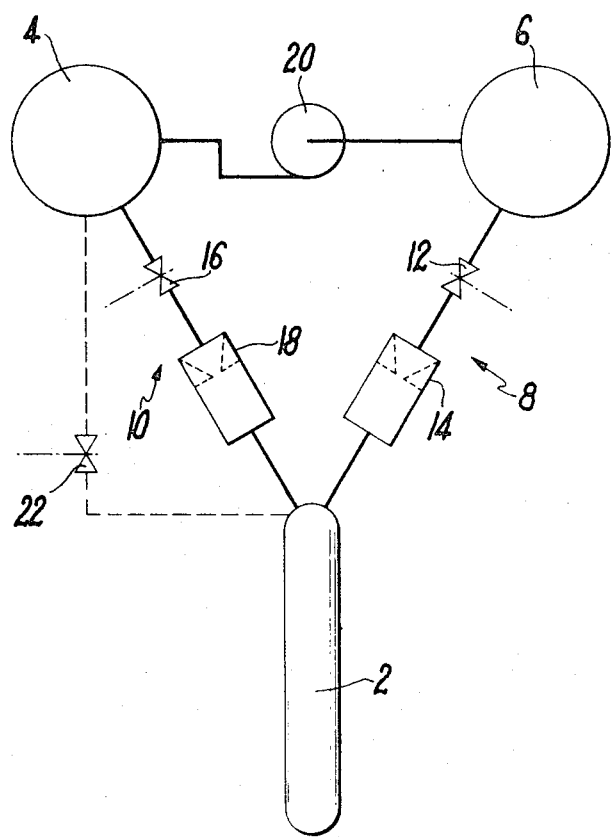
Figure 2:
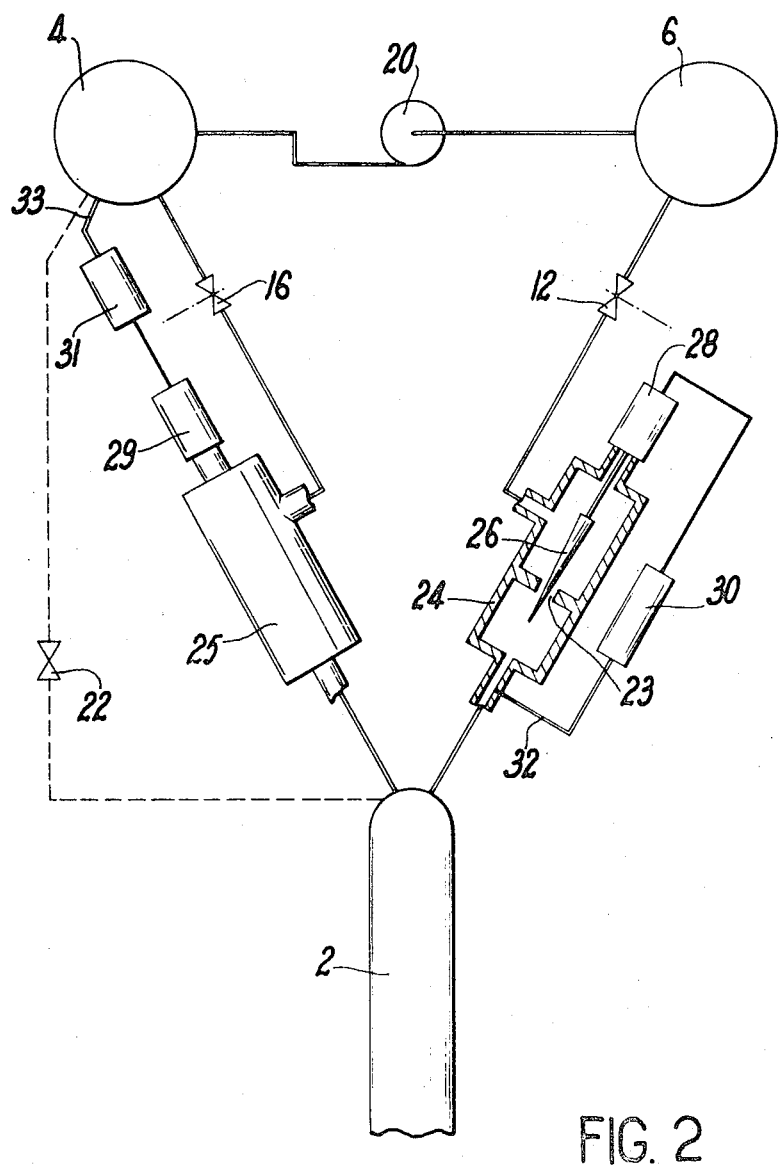
FIG. 2 illustrates a device for carrying out the invention.

The device which has already been described with reference to FIG. 1 is shown in FIG. 2 in an improved form in accordance with the invention. Similar elements which are reproduced in several figures are designated by the same reference numerals.

In this embodiment, the diaphragm 14 is replaced by the opening 23 of the valve 24 which is provided with a needle 26, the area of said opening being variable according to the position of the needle. Said needle 26 is actuated by the device 28 which is controled by the computer 30, said computer being connected to the control rods by way of a pipe 32, the pressure transmitted by said pipe being employed to control the computer.

Similarly, the diaphragm 18 is replaced by the opening of the needle valve 25. This position is set by the device 29 which is controlled by the computer 31, said computer being connected to the high-pressure reservoir by means of a pipe 33, the pressure transmitted by said pipe being employed to control the computer.

The control of the valves 24 and 25 can be substantially simplified by setting the position of each valve needle by means of a pressure capsule at the pressure of the gaseous mixture within the control rods.

Figure 3:
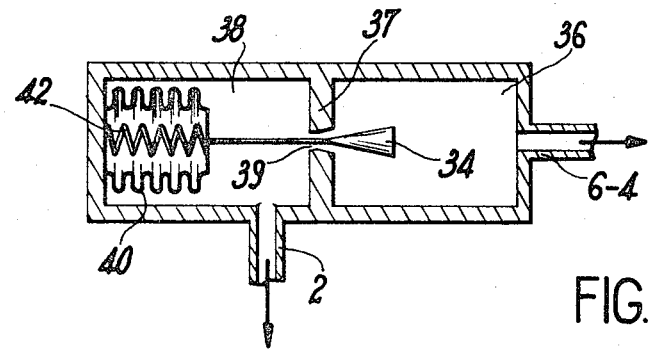
FIG. 3 illustrates a needle valve which is positionally controlled by means of a pressure capsule.

The device of FIG. 3 illustrates this variant. There is accordingly shown a needle valve 34 which is inverted as a result of the arrangement of the associated control system.

It is seen from the figure that, on each side of the partition wall 37 in which is formed the opening 39 whose area is varied by means of the needle, provision is made for a chamber 36 which is connected to the high-pressure reservoir 4 or to the low-pressure reservoir 6 and for a chamber 38 which contains the piezometric capsule 40 and which is adapted to communicate with the gas-filled control rods 2. Said capsule 40 is constituted by a length of flexible tubing which is closed at both ends and balanced internally by means of a spring 42.

The particularly simple unit of FIG. 3 can be improved by making use of a fluid under pressure for the purpose of controlling the piezometric capsules. This is the case of FIG. 4 which illustrates a device which serves both to regulate the areas of the communication openings between the control rods and the two reservoirs. The regulating device or unit 45 consists of a cylinder which communicates with the high-pressure reservoir 4 by way of an inverted needle valve 44 and with the low-pressure reservoir 6 by way of a simple needle valve 46. The positions of said needle valves are determined by the position of one of the movable walls of each piezometric capsule 48 (or 50). The capsules are operated and filled by a fluid under a predetermined pressure $P_s$.

The control unit of FIG. 5 is an alternative form of the device of FIG. 4 in which the needle valves 52 and 54 which provide a communication between the gas-filled control rods and the low-pressure and high-pressure reservoirs 4 and 6 are controlled by means of the deformations of two flexible diaphragms 56, 58.

What is claimed is:

1. An apparatus for regulating the pressure of a neutron absorbing gas contained within a circulation loop disposed within a nuclear reactor core which comprises a high pressure reservoir for said gas, a low pressure reservoir for said gas and a connecting circuit providing communication between said circulation loop and each of said high and low pressure reservoirs, said connecting circuit including a closure valve, a means for providing a restricted gas flow communication and a regulating means separate from said closure valve responsive to the pressure in at least one of said high pressure reservoir, low pressure reservoir and circulation loop for automatically varying the cross-section of said gas flow communication, said regulating means comprising a housing divided by a partition means into a first and second chamber, the first chamber communicating through an aperture with the low pressure reservoir and the second chamber communicating through an aperture with the high pressure reservoir, said partition means also containing an aperture therein, first and second manometric capsule means disposed in the first chamber, conduit means for introducing a fluid under pressure to said manometric capsule means, which pressure is responsive to the pressure in at least one of said high pressure reservoir, low pressure reservoir and circulation loop, a needle valve means communicating with first said manometric capsule means and adapted to be received by the aperture leading to the low pressure reservoir and an inverted needle valve adapted to be received by the aperture in the partition means and communicating with the second capsule means, the positions of the needle valves being determined by one of the movable walls of each of the manometric capsules.

2. An apparatus for regulating the pressure of a neutron absorbing gas contained within a circulation loop disposed within a nuclear reactor core which comprises a high pressure reservoir for said gas, a low pressure reservoir for said gas and a connecting circuit providing communication between said circulation loop and each of said high and low pressure reservoirs, said connecting circuit including a closure valve, a means for providing a restricted gas flow communication and a regulating means separate from said closure valve responsive to the pressure in at least one of said high pressure reservoir, low pressure reservoir and circulation loop for automatically varying the cross-section of said gas flow communication, said regulating means comprising a housing a first and second flexible diaphragm means communicating with one side of the housing and aperture means disposed in the other side of the housing directly opposite the first and second flexible diaphragm means, said aperture means communicating with the low and high pressure reservoirs, respectively, first and second needle means adapted to be received by the aperture in the housing, said needle means also communicating with the respective first and second diaphragm means and conduit means providing communication between the housing and the circulating loop.

3. The apparatus of claim 2, wherein each of the flexible diaphragms is disposed in a chamber, dividing said chamber into two zones, respectively, one zone communicating with a source of fluid pressure and the other zone communicating with the housing, said source of fluid pressure being responsive to the pressure in at least one of said high pressure reservoir, low pressure reservoir and circulation loop.

4. The apparatus of claim 1, wherein each of the manometric capsules is composed of a length of flexible tubing or bellows which is closed at both ends.

References Cited
UNITED STATES PATENTS

| | | | |
|---|---|---|---|
| 2,990,358 | 6/1961 | Manley | 176—86 X |
| 3,025,228 | 3/1962 | Whitelaw | 176—86 X |
| 3,227,619 | 1/1966 | Plante | 176—86 X |
| 3,251,746 | 5/1966 | Jeffries et al. | 176—86 X |

FOREIGN PATENTS

| | | | |
|---|---|---|---|
| 978,016 | 12/1964 | Great Britain | 176—86 X |
| 843,871 | 8/1960 | Great Britain | 176—86 X |

CARL D. QUARFORTH, Primary Examiner

G. G. SOLYST, Assistant Examiner